United States Patent [19]

Rozmus

[11] E Re. 31,355

[45] Reissued Aug. 23, 1983

[54] METHOD FOR HOT CONSOLIDATING POWDER

[75] Inventor: Walter J. Rozmus, Traverse City, Mich.

[73] Assignee: Kelsey-Hayes Company, Romulus, Mich.

[21] Appl. No.: 237,513

[22] Filed: Feb. 23, 1981

Related U.S. Patent Documents

Reissue of:

[64] Patent No.: 4,142,888
Issued: Mar. 6, 1979
Appl. No.: 778,009
Filed: Mar. 16, 1977

U.S. Applications:

[63] Continuation-in-part of Ser. No. 692,310, Jun. 3, 1976, abandoned.

[51] Int. Cl.[3] ..... B22F 3/14; B22F 7/04

[52] U.S. Cl. ..... 419/49; 220/1 S; 249/105; 249/135; 249/160; 264/102; 264/109; 419/48; 425/78; 425/405 H

[58] Field of Search ..... 75/201, 223, 208, 200, 75/214, 226, 246; 249/134, 135, 160, 105; 220/1 S; 264/102, 109, 111, 65, 125; 425/78, 135, 160, 405 H; 29/400 R, 420.5

[56] References Cited

U.S. PATENT DOCUMENTS

| | | | |
|---|---|---|---|
| 2,198,634 | 4/1940 | Richter | 249/135 X |
| 2,341,860 | 2/1944 | Ellis | 75/226 |
| 3,258,818 | 7/1966 | Smith | 249/135 X |
| 3,461,506 | 8/1969 | Rice et al. | 249/135 X |
| 3,461,507 | 8/1969 | Rice | 249/135 X |
| 3,500,513 | 3/1970 | Stanley | 425/405 H |
| 3,531,848 | 10/1970 | Gripshover et al. | 75/208 R |
| 3,622,313 | 11/1971 | Havel | 75/226 |
| 3,650,646 | 3/1972 | Kirpatrick et al. | 425/405 H |
| 3,824,097 | 7/1974 | Smythe et al. | 75/226 |
| 3,866,303 | 2/1975 | Chehi | 75/226 |
| 3,940,268 | 2/1976 | Catlin | 75/208 R |
| 3,970,517 | 7/1976 | VanNederveen | 75/226 X |
| 3,982,934 | 9/1976 | Wentzell | 425/405 H X |
| 3,992,200 | 11/1976 | Chandhok | 75/226 X |
| 4,041,123 | 8/1977 | Lange et al. | 75/226 X |
| 4,065,320 | 12/1977 | Turillon | 75/226 |
| 4,077,109 | 3/1978 | Larson | 75/226 |
| 4,094,709 | 6/1978 | Rozmus | 75/226 |
| 4,126,451 | 11/1978 | Mayar | 75/223 |
| 4,142,888 | 3/1979 | Rozmus | 75/226 |
| 4,178,178 | 12/1979 | Garvare et al. | 75/226 |

*Primary Examiner*—Gary P. Straub
*Attorney, Agent, or Firm*—Harold W. Milton, Jr.

[57] ABSTRACT

A [container] *method* for hot consolidating powder of metallic and non-metallic composition and combinations thereof by the application of heat and pressure [wherein the] *to a thick-walled and regularly shaped* container [includes] *having* a mass of container material which is substantially fully dense and incompressible and is capable of plastic flow at [pressing] *conventional compaction* temperatures, a cavity of [a predetermined] *an irregular* shape formed within the mass for receiving a quantity of powder, the mass including walls around the cavity of sufficient thickness so that the exterior surface thereof does not closely follow the contour of the cavity whereby, upon the application of heat and pressure to the container, the mass acts like a fluid to apply hydrostatic pressure to the powder contained in the cavity.

16 Claims, 7 Drawing Figures

METHOD FOR HOT CONSOLIDATING POWDER

Matter enclosed in heavy brackets [ ] appears in the original patent but forms no part of this reissue specification; matter printed in italics indicates the additions made by reissue.

This is a continuation-in-part of patent application Ser. No. 692,310, filed June 3, 1976, now abandoned.

FIELD OF THE INVENTION

This invention relates to the field of powder metallurgy and specifically to a container for hot consolidating powder of metallic and non-metallic composition and combinations thereof and a method for using the same.

Hot consolidation of metallic, intermetallic, and non-metallic powders and combinations thereof has become an industry standard. The advantages of hot consolidation over other techniques for consolidating powders are well known. In some cases, hot consolidation is the only practical powder metallurgical technique for consolidating certain high temperature material. For example, hot consolidation is employed extensively for high temprature - high stress materials, such as nickel-base superalloys (e.g. IN-100).

Hot consolidation can be accomplished by filling a container with a powder to be consolidated. The container is usually evacuated prior to filling and then hermetically sealed. Heat and pressure are applied to the filled and sealed container. This can be accomplished by using an autoclave. The gas pressure produced in the autoclave applies an equal pressure over the surface of the container and causes the container to shrink, or collapse, against the powder. As the container shrinks, or collapses, the powder is densified. In other words, at elevated temperatures, the container functions as a pressure transmitting medium to subject the powder to the pressure applied to the container. Simultaneously, the heat causes the powder to fuse by sintering. This process for densifying powder is generally referred to as hot isostatic pressing. In short, the combination of heat and pressure causes consolidation of the powder into a substantially fully densified and fused mass in which the individual powder particles have lost their identity.

After consolidation, the container is removed from the densified powder compact. The compact is then further processed through one or more steps, such as forging, machining, and/or heat treating, to form a finished part.

An extremely critical element of the hot consolidation process is the nature and characteristics of the container. The material of which the container is made must be capable of performing as a pressure transmitting medium at temperatures high enough to cause sintering of the powder, that is, the container must be flexible or deformable yet maintain structural integrity at elevated temperatures. The container must be non-reactive, or only slightly reactive, with respect to the powder contained therein, or steps must be taken to shield the container from the powder. Since the container must be hermetically sealed, and in some cases vacuum evacuated, the container must be capable of withstanding heating and pressing without cracking. The type of container employed will also determine, to a large extent, the degree of precision with which the compact can be made. In other words, some types of containers are only capable of producing simple billet stock shapes and rough preforms which require extensive subsequent forging and machining to produce a finished part.

Due to the high cost of raw material and the cost of forging, recent efforts have been made to develop containers capable of producing compacts of greater precision to thereby reduce material and forming costs. Such high precision compacts are generally referred to as "near-net shapes". Such precision compacts would only require machining or, at most, a simple forging operation, to produce a final shape, thus eliminating extensive intermediate forging steps. This invention is directed to a hot isostatic pressing container which meets the foregoing requirements as well as demonstrating the capability of producing near-net shapes.

PRIOR ART

The prior art includes many examples of containers for hot consolidating powder. These containers are made of various materials, such as metal, glass, and ceramics. The earliest containers used for hot consolidating powder, and the ones most commonly encountered in current industrial practice, are made of metal. The particular type of metal employed for the container is usually selected in view of the composition of the powder to be consolidated. That is, the requisite temperatures and pressures of consolidation and the reactivity of the powder are taken into consideration when determining the container material. Metal containers for hot consolidating nickel-base superalloys are commonly made of stainless steel. Other metals, however, are used for powders of different composition.

Examples of typical metal containers are shown in U.S. Pat. No. 3,340,053, issued Sept. 5, 1967, and U.S. Pat. No. 3,356,496, issued Dec. 5, 1967. It is noted that these metal containers are relatively thin-walled and of simple shape. The reason that thin-walled containers have been used is that an effort was made to duplicate, as near as possible, the behavior of a flexible rubber bag of the type which had been used to isostatically press powders at near room temperature. Of course, rubber bags could not be used at the elevated temperatures required for hot consolidation. The theory was, however, that a thin-walled metal container would behave, at elevated temperatures, much like a rubber bag at near room temperature. It was learned that this was not the case. The walls of a thin-walled metal container do not transmit pressure evenly to the powder due to variations in the structural strength of the container. Consequently, thin-walled metal containers tend to buckle or wrinkle in weaker sections. When simple shapes, such as billet stock or forging preforms, are being produced, surface defects caused by buckling and wrinkling of the thin-walled metal container can sometimes be tolerated since these defects can be removed by machining. It is very difficult, if not impossible, however, to produce more complicated precision shapes using thin-walled metal containers. One of the greatest difficulties in producing precision shapes using thin-walled metal containers is that the resulting compact is greatly distorted due to non-uniform reduction in the size of the container. In other words, the shape of the resulting compact after compaction is far different from the shape of the cavity initially defined by the thin-walled container. Although such distortions, in most cases, can be accomodated for by making a greatly over-sized compact, this is done at the expense of excessive forging and/or machining and material waste.

Attempts have been made to solve the problems associated with thin-walled containers and to provide a container capable of producing near net shapes. For example, in the U.K. Pat. No. [1,339,669] *1,399,669*, published July 2, 1975, a method of consolidating metallic powder is disclosed in which a relatively thick-walled container is formed by joining two mold halves which are made of sintered metal powder and by encasing the mold halves in an outer metal sheath. The mold havles are made of sintered metal powder so that the porosity, or density, of the walls of the mold halves are approximately equal to the tap density of the powder contained in the cavity formed by the mold halves. Upon the application of heat and pressure, it is intended that the density of the container and the powder contained therein both increase substantially simultaneously to uniformly compact the powder without distortion. Another deviation from the traditional thin-walled metal container is disclosed in U.S. Pat. No. 3,230,286, issued Jan. 18, 1966. The container disclosed in this patent is made of a metal, such as cerium, bismuth, cesium, or alloys thereof, which undergoes an abrupt densification, or reduction in volume, at a predetermined pressure. The abrupt densification, or reduction in volume, is due to a rearrangement of the crystal lattice structure of the material caused by the applied pressure. The reduction in volume is relied upon to apply pressure to the powder contained within the container.

In summary, in the development of containers and methods for hot isostatic pressing powder, the first efforts were to simulate a flexible rubber bag. Hence, thin-walled metal containers were employed. As the art advanced, various attempts were made using thicker walled containers; however, in the case of metal containers, the containers were made porous or an exotic alloy was employed which is capable of an abrupt densification under the influence of extreme pressures. These rather complicated measures were taken because it was generally believed that a thick-walled container would not effectively transmit pressure to the powder. When materials other than metals were employed, such as glass or ceramics, the container walls were also made relatively thin. If not thin, then the material was in particulate form. This required additional steps to contain the particulate material, such as the use of the inner and outer containers shown in U.S. Pat. No. 3,700,435, issued Oct. 24, 1972. Notwithstanding all the development effort thus far expended, there is no commercially acceptable container available which is capable of producing precision compacts or near-net shapes.

SUMMARY OF THE INVENTION

This invention is based upon a recognition by the inventor that a superior container for hot consolidating powder can be made from a substantially fully dense and incompressible material if the material is capable of plastic flow at pressing temperatures and that, if the container walls are thick enough, the container material will act like a fluid upon the application of heat and pressure to apply hydrostatic pressure to the powder. In other words, it is not necessary to use a porous material as described in U.K. Pat. No. 1,399,669 and U.S. Pat. No. 3,700,435 or a material which undergoes an abrupt densification as described in U.S. Pat. No. 3,230,286. It has been determined by the inventor that the container walls are thick enough to function in the intended manner when the exterior surface of the container walls does not closely follow the contour of the container cavity. In other words, the exterior surface of the walls of the container should not follow the contour of the container cavity as, for example, do the walls of the container described in U.S. Pat. No. 3,841,870, issued Oct. 15, 1974. It is noted that the exterior surface of the walls of the container described in this patent define a shape which is substantially identical to the shape of the container cavity. This is typical of what is referred to as a "thin-walled" container.

The container of the instant invention constitutes a radical departure from the generally accepted principles relating to containers for hot consolidating powder. The fact that the container is capable of applying hydrostatic pressure to the powder facilitates uniform shrinkage, permits a closer prediction of final dimensions, and reduces distortion. Hence, it is possible to produce near-net shapes. In order to achieve these results, however, a container is used which is made of a substantially fully dense and incompressible material. The walls of the container surrounding the powder-receiving cavity are thicker than the prior art suggests would be capable of transmitting pressure. Any heretofore known containers having walls of any significant thickness have been made of a compressible or particulate material. It has been discovered by the inventor that the thickness of the container walls does not hinder consolidation, but to the contrary, is desirable and essential to produce a hydrostatic-like pressure at the interface between the container material and the powder in the cavity. In other words, a thick-walled container of the type described herein produces better results than thin-walled containers because of its ability to apply hydrostatic pressure to the powder.

The container of the instant invention was specifically designed for consolidating superalloy powder, such as, IN-100, which is a well-known nickel-base alloy which includes alloying elements of aluminum, titanium, tantalum, columbium, molybdenum, tungsten, chromium and cobalt. IN-100, and other superalloys, are employed in turbine engine components, for example, because of their high strength characteristics at elevated temperatures. These high strength characteristics, however, make these alloys difficult to work. Conventional casting techniques cannot easily be used since the many alloying elements produce segregation problems in the cast object. Additionally, the inherent strength of these alloys at high temperatures make forging difficult and expensive. Accordingly, it has become necessary to employ powder metallurgy techniques to produce superalloy parts having optimum physical characteristics. Even present day powder metallurgy techniques often require multiple forging and machining operations to produce a final shape. Efforts have therefore been made to produce precision powder metal compacts, or near-net shapes, to reduce, or eliminate, forging and to reduce the amount of material which must be removed by machining to produce a finished shape. The container constructed in accordance with the instant invention offers this advantage.

Other advantages of the present invention will be readily appreciated as the same becomes better understood by reference to the following detailed description when considered in connection with the accompanying drawings wherein.

Figure 1:
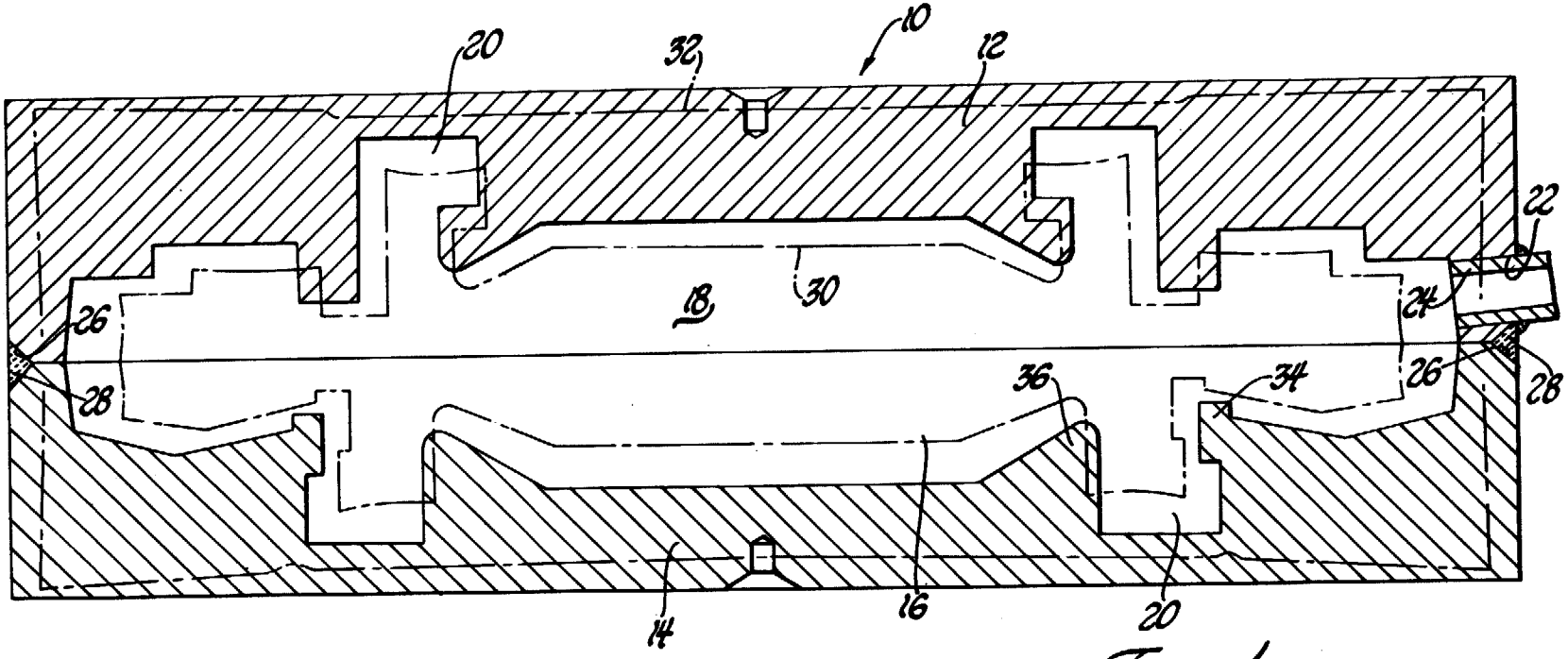
FIG. 1 is a cross-sectional elevational view of a container for hot consolidating powder constructed in accordance with the instant invention showing the container before hot consolidation and, in phantom, after hot consolidation.

Referring more particularly to the drawings, a container for hot consolidating powder constructed in accordance with the instant invention is generally shown at 10 in FIG. 1.

The container 10 includes an upper die section 12 and a lower die section 14. In the embodiment shown, the upper and lower die sections 12 and 14 are made from standard billet stock of low carbon steel, such as an SAE 1008 to 1015 steel. Low carbon steel is a particularly desirable material for the container 10 since it is relatively inexpensive and easy to machine. It is noted, however, that other metals can be employed and, in fact, other materials, such as glass or ceramic, as long as the materials behave in the manner set forth herein.

In order to make the container 10 shown in FIG. 1, two pieces of low carbon steel were machined using standard metal cutting techniques to form the upper and lower die sections 12 and 14. When the die sections 12 and 14 are joined along their mating surfaces, the upper and lower die sections form a cavity 16 having a predetermined desired configuration. The container 10, shown in FIG. 1, is specially adapted to form a type of turbine disc for a jet engine. For this particular turbine disc, the cavity 16 is provided with a main section 18, which is generally disc-shaped, for forming the body of the turbine disc and a ring portion 20 which extends generally laterally from each side of the disc-shaped main section 18.

The size and shape of the cavity is determined in view of the final shape of the part to be produced. Since IN-100 powder has a tap density which is less than its theoretical density, typically 65% of theoretical density, the cavity is made large enough to accomodate a reduction in size sufficient to reach approximate theoretical density in the densified compact. Additionally, the container is designated so that the size of the densified compact after consolidation is somewhat larger than the final part. This extra material is removed by machining to form the final part.

Before the upper and lower die sections are assembled, a hole 22 is drilled in one of the die sections 12 and a fill tube 24 is inserted. The fill tube 24 for the container 10 is a piece of cold-drawn seamless steel tubing. The fill tube 24 is attached to the upper die section 12 by welding. Care is taken to insure that the welds do not leak since the fully assembled container must be evacuated to a level of about 5–10 microns prior to filling.

After the fill tube 24 has been attached, the two die sections 12 and 14 are placed in mating relationship and welded together. In order to facilitate welding, the outer edges of the die sections 12 and 14 are chamfered at approximately a 45° angle. When the two die sections 12 and 14 are properly assembled, the chamfered edges form a welding trough 26 for receiving weld material 28. Again, care is taken during welding to insure that a hermetic seal is produced to permit evacuation.

It is noted that the starting pieces of billet stock, out of which the upper and lower die sections 12 and 14 were made, are of sufficient size so that, after machining, relatively thick walls remain. That the container includes thick walls is evidenced by the fact that the external shape of the container 10 has no relation to the complex shape of the cavity 16 therein. A characteristic of the thick-walled containers tested is that the volume of the cavity is not greater than the total volume of the container walls. As will be further described, the use of thick walls reduces the distortion problems associated with thin-walled containers and permits the production of near-net shapes.

While low carbon steel was used to make the container 10, other materials can be employed. Suitable container material is characterized by certain physical characteristics. Using low carbon steel as an example, in billet stock form, the starting material for the container 10 described herein, the material is substantially fully dense. In other words, ignoring production defects, such as random porosity and the like, the steel is as close to its theoretical density as can be obtained by standard production methods. Low carbon steel is also substantially incompressible in that its volume cannot be significantly reduced by the application of pressure. The container material must also be gas impervious, as is low carbon steel, to permit hermetic sealing of the container. These characteristics and physical properties distinguish the container material of the instant invention from many of the materials heretofore employed. Further distinguishing characteristics are that the container walls are substantially uniform in composition across a cross-section from the exterior surface to the cavity and that the container walls are of substantially uniform density.

In addition to the foregoing, the container material must function as a pressure transmitting medium at the temperature and pressure necessary to consolidate the powder. In order to achieve this result, the container material must be capable of plastic flow at suitable pressing temperatures. Specific pressing temperatures are determined, in great part, by the composition of the particular type of powder being compacted. Once the pressing temperature is determined, a suitable container material can be selected which is capable of plastic flow at such temperature. Most metals are capable of plastic flow even at room temperature, therefore, consideration must also be given to the amount of pressure required to cause plastic flow in the container material at the suitable pressing temperature. As the temperature increases the tensile strength of metal decreases so that lower pressures are required to cause significant plastic flow. In other words, in order to consolidate any given powder, the temperature, as well as the pressure, must be determined. Once these two parameters are determined then a container material is selected which is plastic, i.e. has a low enough tensile strength, at the particular temperature so that it will deform plastically with relative ease at the particular pressure employed. In the case of IN-100, pressing temperatures of between 1850° and 2200° F. are common. As is well-known, low carbon steel is capable of plastic flow under stress, and this capability increases with increasing temperature. At temperatures of 1850° to 2200° F., significant plastic flow can be induced by the application of pressures of 10,000 to 15,000 psi. While these pressures are commonly used in practice, lower or higher pressures may be used. In all cases, the extent of plastic flow depends upon the tensile strength of the material at the pressing temperature.

Another significant consideration is that the structural integrity of the container must be maintained during hot consolidation. Structural integrity of a metal container is maintained as long as the temperature of consolidation does not exceed the melting temperature of the container material. More precisely, the temperature should not exceed the melting temperature of any major solid phase of the container material. If the melting point is exceeded, the container material will lose its strength in shear. This would lead to the destruction of the container. Since other potential container materials, e.g., glass, consist of a super-cooled liquid, it cannot reach the liquid state. A glass container formed in accordance with the instant invention would retain sufficient strength until its viscosity becomes so low that the glass is fluid. Therefore, as a rule, the container material must retain sufficient strength at pressing temperatures to maintain the structural integrity of the container.

Another physical property of the container material which must be taken into consideration is the material's rate of expansion and contraction with temperature. When complex shapes are being produced, such as those which include undercuts and the like, it is believed that the thermal expansivity of the container must be reasonably close to that of the material being consolidated. If the thermal characteristics of the two materials are widely different, stresses will be built up in the compact during cooling which could cause fracture. While a critical difference has not been precisely determined, it is at least known that the difference in thermal expansivity between an SAE 1010 steel and IN-100 is not deleterious. In order to determine the best container material for consolidating other types of powder it may be necessary to conduct preliminary tests to insure that the thermal characteristics of the respective materials are compatible.

IN-100 powder and other superalloys are normally compacted at temperatures of between 1850° and 2200° F. and pressures from 10,000 to 15,000 psi. Such pressures can easily be attained in commercially available autoclaves. At temperatures of between 1850° and 2200° F. and pressures of 10,000 to 15,000 psi, the walls of a thick-walled low carbon steel container act very much like a fluid. That is, the metal can flow under stress. Due to the fluid-like behavior of the container walls at these temperatures and pressures, a hydrostatic pressure is applied to the powder contained in the cavity. As used herein, a hydrostatic pressure is one in which the direction of the force acting on any surface of the powder is normal to the surface. A major problem with thin-walled containers is that, while a hydrostatic pressure may be applied to the external surface of the container, the container is not capable of transmitting a hydrostatic pressure to the powder. The application of a hydrostatic pressure will insure that near uniform shrinkage will occur.

It has been determined that the walls of a container are thick enough to accomplish the intended result, i.e. a hydrostatic pressure, if the exterior surface of the walls do not closely follow the contour of the cavity. This definition is, at best, an approximation of what is referred to as a "thick-walled" container. In terms of a desired result, a thick-walled container is one which has walls that are thick enough to produce a hydrostatic pressure on the powder upon the application of heat and pressure. By way of an example, the greatest problem associated with thin-walled containers arise when the part to be produced includes an annular portion, such as the ring-shaped extensions of the part shown in FIG. 1. A typical thin-walled container surrounds three sides of the extension, as viewed in cross section, leaving the interior volume vacant. This arrangement causes serious distortion problems during hot consolidation. As a minimum, the thickness of the container in the region of the annular portion must be sufficient to substantially fill the interior volume. When this is accomplished it can no longer be said that the exterior surface of the container follows the contour of the cavity. The result is that the container walls solidly support the sides of the ring portion so that practically uniform and undistorted shrinkage will occur.

The container 10 was processed in the following manner. Once the die sections 12 and 14 were welded together, a vacuum pump was connected to the fill tube 24 and the cavity 16 was evacuated. This procedure was followed in the case of IN-100 powder to prevent contamination by atmospheric gases which would produce undesirable oxides and nitrides and to eliminate a potential source of porosity in the resulting compact. Additionally, a vacuum within the container increases the difference in pressure between the external and internal surfaces to facilitate pressing. It is noted, however, that these precautions may not be necessary for other types of powder. Once evacuated, the container 10 was filled with atomized IN-100 powder. During the filling stage it was necessary to fill all portions of the cavity 16 and to achieve the highest tap density. This was accomplished by rotating the container and by striking the sides of the container with a mallet. It is noted that this procedure, although highly successful in insuring complete filling and maximum tap density, is difficult to perform on a thin-walled metal container without bending the walls and changing the shape of the cavity. After the container 10 was filled, the fill tube 24 was hermetically sealed by pinching it closed and welding it. The filled and sealed container 10 was then placed in an argon gas autoclave. The autoclave was cycled to subject the container 10 to a temperature of approximately 1950° F. and a pressure ranging up to 10,000 to 15,000 psi over a period of approximately two hours.

The pressure in the autoclave produced an isostatic pressure over the surface of the container. At the pressing temperature of 1950° F., the low carbon steel had softened to the point where it could no longer support the pressure applied (10,000–15,000 psi) and plastic flow occured. The applied pressure provided the driving force for reducing the size of the cavity. It is possible to reduce the size of the cavity because the cavity is filled with a compressible material, i.e., the less than fully dense powder. The size of the cavity continues to shrink until the powder reaches approximately full density. As the powder densifies it also fuses by sintering so that the compact produced was a fully dense and solid mass.

After consolidation, the container 10 was removed from the autoclave and cooled. The container was then removed from the densified compact by pickling in a nitric acid solution. Since IN-100 is corrosion resistant, the nitric acid solution preferentially attacked the low carbon steel container. The container dissolved leaving the densified IN-100 compact. While a nitric acid solution was employed, other types of solutions can be used. Alternatively, the container could have been removed by machining or a combination of rough machining followed by pickling.

Before the container 10 was removed from the densified compact, the external shape of the container was measured and recorded. After the container 10 was removed, the dimensions of the densified compact were measured. By comparing the size and shape of the densified compact with the original cavity, the amount and manner of shrinkage could be determined. The deminsions of the container after compaction and of the densified compact are shown in phantom in FIG. 1. Specifically, phantom line 30 outlines the shape of the densified compact while phantom line 32 outlines the exterior shape of the container 10.

Figure 2:
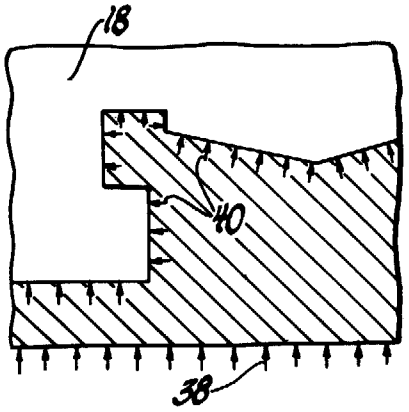
FIG. 2 is a broken-away view of FIG. 1 illustrating probable force distribution when pressure is applied to the container.

It is noted that surprisingly uniform shrinkage occurred. Moreover, wall thickness of the container increased. The fact that areas such as 34 and 36 increased in thickness, or size, during hot compaction indicates that the direction of force applied to the powder was hydrostatic and unrelated to the direction of the force acting upon the surface of the container. This is shown schematically in FIG. 2 which illustrates the probable directions of the forces acting upon the powder and the container. The direction of the force acting upon the surface of the container, which is indicated by arrows 38, is perpendicular to the container surface. The direction of the force's action upon the powder, which is indicated by arrows 40, is generally perpendicular to the surface of the cavity. The direction of forces acting on the powder, however, is not necessarily parallel to the direction of the force action on the container surface. This is characteristic of a hydrostatic pressure. This indicates that the container walls actually act like a fluid to apply a hydrostatic pressure to the powder. The result is a more uniform reduction in the size of the cavity.

For a number of reasons low carbon steel appears to be the most commercially attractive material from both economic and processing standpoints for making containers to hot consolidate IN-100 and other superalloy powders. Low carbon steel is relatively inexpensive (as compared to the cost per pound of the powder to be consolidated) and is easy to obtain. Low carbon steel is very machinable, it can be welded easily, and the finished container can withstand significant abuse. It is pointed out, however, that thick-walled containers in accordance with the instant invention may be made of other metals and other materials. Glass and ceramics are examples of such materials. The important result is that plastic flow coupled with sufficiently thick container walls will produce a hydrostatic pressure upon the powder.

It is also noted that the invention is not limited to producing a cavity by machining. Other well-known metalworking techniques, such as, casting or forging may be employed to produce the container. For example, a cast container can be produced by using an expendable core having the shape of the desired cavity. After the metal is cast around the expandable core, the core is removed, such as by leaching. A two-part container could also be produced by a forging process. The only drawback with forging is that undercuts could not be produced such as are possible with machining or casting.

Figure 3:
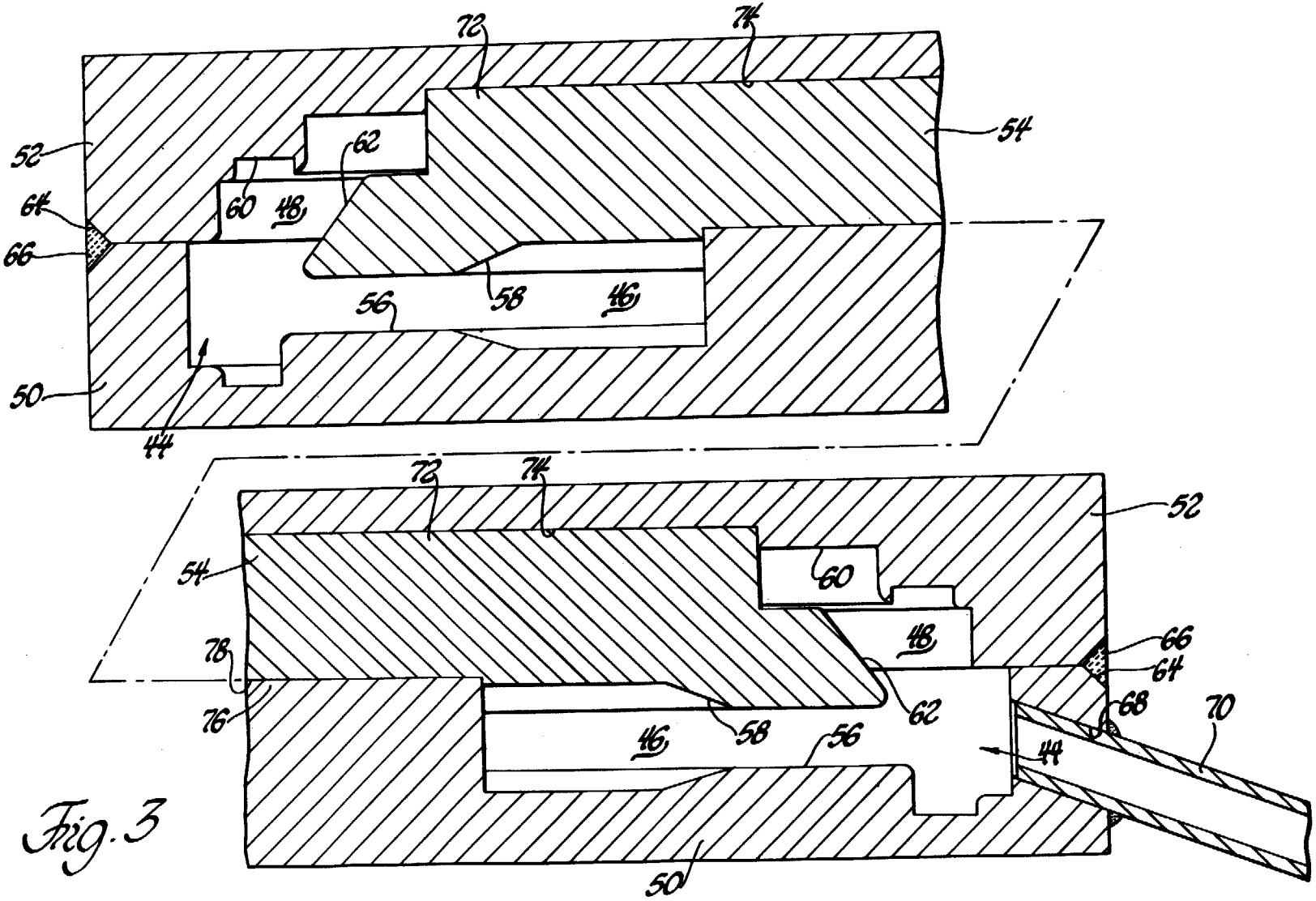
FIG. 3 is a cross-sectional elevational view of another embodiment of a container for hot consolidating powder constructed in accordance with the instant invention.
Figure 4:
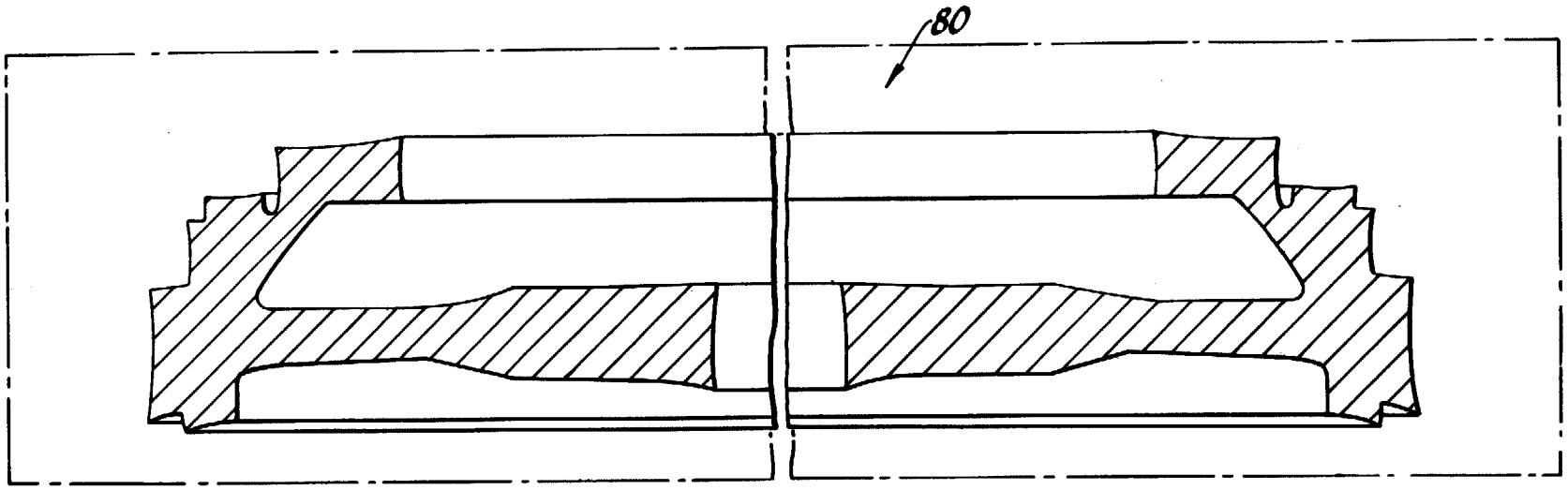
FIG. 4 is a cross-sectional elevational view of a densified compact subsequent to hot consolidation in the container of FIG. 3.
Figure 5:
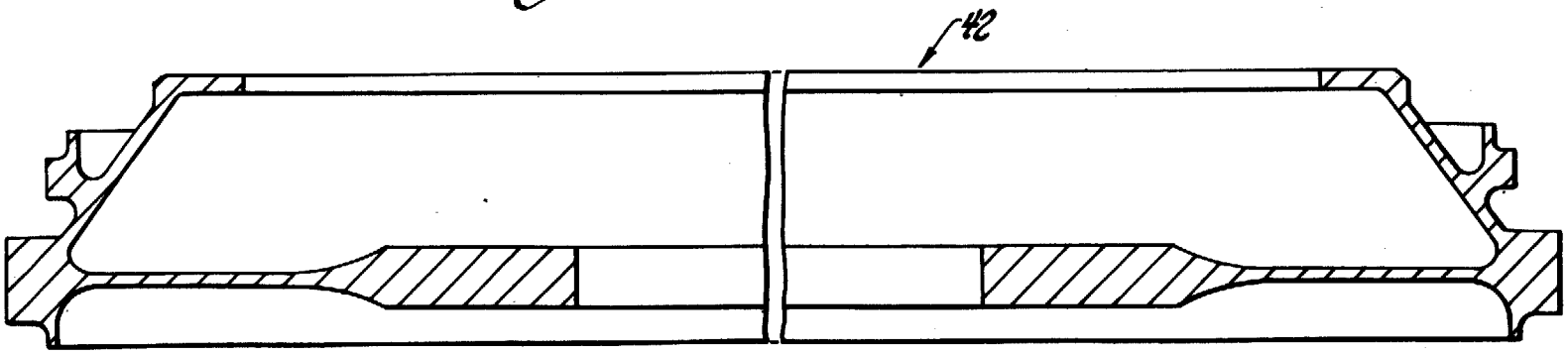
FIG. 5 is a cross-sectional elevational view of a finished part machined from the densified compact of FIG. 4.

A unique method for assembling a container for producing a part of extremely complex shape is shown in FIGS. 3 through 5. The desired part is shown generally at 42 in FIG. 5. It is noted that this is a rather complex turbine disc which includes a number of undercuts. In order to produce a densified compact which can be machined to produce the part 42 shown in FIG. 5, a cavity, generally indicated at 44, is formed in a thick-walled container having the shape shown in FIG. 3. It should be apparent, that it would be difficult, if not possible, to machine a cavity of such complex shape in a two-section container, such as the one previously described and shown in FIG. 1. In order to produce the part shown in FIG. 5, the cavity 44 includes a generally disc-shaped portion 46 and a generally ring-shaped portion 48 extending substantially laterally from the disc-shaped portion 46. In addition, the ring-shaped portion 48 angles inwardly in such a manner that it would be difficult to machine. Hence, the container is made in three sections. Specifically, the container includes a first main section 50, a second main section 52, and an intermediate section 54. The first main section 50 and the intermediate section 54 includes surfaces 56 and 58 which generally define the disc-shaped portion 46 of the cavity 44. The second main section 52 and the intermediate section 54 include surfaces 60 and 62 which define the ring-shaped portion 48. These three sections are machined separately and then fitted together to form the complex cavity 46.

As in the first embodiment of the container, the first and second main sections 50 and 52 include joinable mating surfaces. The outer edges of these surfaces are chamfered to form a weld trough 64 for receiving weld material 66. A hole 68 is drilled in one of the main sections, in this case, the first main section 50 for receiving a fill tube 70 which is attached by welding. As shown in FIG. 3, the intermediate section 54 is supported between the first and second main section 50 and 52 by cooperating the interfitting means which locate and support the intermediate section 54. The cooperating interfitting means includes an extension 72 of the cylindrical portion of the intermediate section 54 which fits into a cylindrical bore 74 in the second main section 52 and also an extension 76 of the cylindrical portion of the first main section 50 which seats in a cylindrical bore 78 in the intermediate section 54.

This container was processed in generally the same manner as the first container. After hot colsolidation the densified compact recovered had the shape shown generally at 80 in FIG. 4. This densified compact was then machined to the final shape shown in FIG. 5. It is particularly pointed out that the final part 42 was produced without a forging operation and with minimal scrap.

The containers described above were subjected to heat and pressure by using an argon gas autoclave. It is noted, however, that other means may be employed to apply heat and pressure. One procedure which has been developed by the inventor herein includes pressing the container between the dies of a press.

Figure 7:
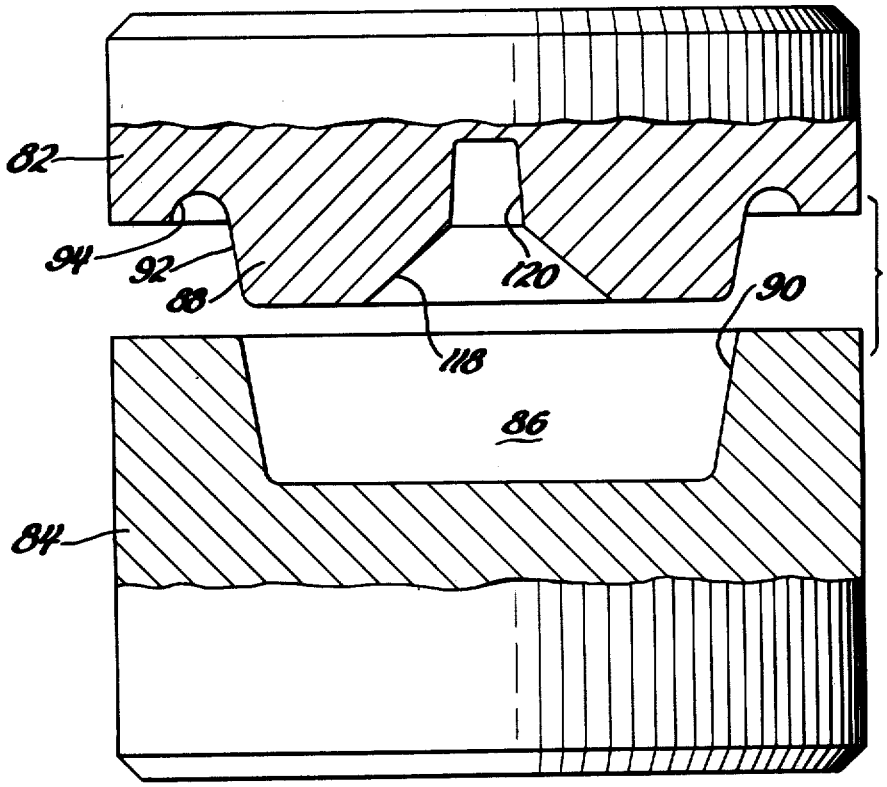
FIG. 7 is a cross-sectional elevational view of suitable upper and lower press dies for use with the container of FIG. 6.

In order to consolidate the powder using a press, a standard mechanical or hydraulic press is outfitted with upper and lower dies similar to the upper and lower dies 82 and 84 shown in FIG. 7. The lower die 84 includes a cavity for receiving a preheated, powder-filled container. The upper die 82 which is mounted on the ram of the press includes an extension 88 which enters the recess 86 to engage and apply pressure to the container. Since the container material has been preheated to a temperature at which plastic flow will occur relatively easily and since the lower die 86 restrains the container, the container material will act like a fluid to subject the powder to a hydrostatic pressure. Since the powder in the container is at less than full density, the pressure of the container material will cause the powder to densify. Densification will proceed until the powder achieves full density. At this point, the entire mass, that is, the container material and the powder, is at full density. The container is then removed from the lower die 84 by a suitable stripping operation and the container material is removed from the densified powder compact.

It is noted that the side walls 90 of the recess 86 in the lower die 84 are tapered and that the sides of the container 96 are provided with a corresponding draft angle to facilitate ejection of the container from the lower die 84 after pressing. The upper die 82 is also tapered to correspond to the taper of the lower die 84.

In the event that a mechanical press is employed, damage to the press could be caused if the powder reaches full density before the ram reaches the end of its downward stroke because the ram would be working against a fully dense and incompressible mass. This could cause breakage of the press crank or at least jamming of the press. Obviously, this problem is not presented in a hydraulic press since its stroke terminates upon reaching a predetermined pressure.

In order to prevent damage to a mechanical press, the upper and lower dies 82 and 84 are designed to permit controlled escape of container material from between the dies when the pressure exceeds a desired maximum. In other words, a gap is provided between the sides 90 of the recess 86 and the lower die 84 and the sides 92 of the extension 88 of the upper die 82 to permit formation of a flash under conditions of excessive pressure. In order to insure that the pressure experienced by the container is sufficiently high to achieve full densification of the powder, it may be necessary to force the escaping container metal to follow a tortuous path. For example, the sides 92 of the upper die 82 may be continued to form a curved surface 94 which would resist the flow of container metal by forcing it to reverse its direction of flow thus extending the path of the material. The additional surface also increases the total frictional resistance experienced by the material. In any event, the upper and lower dies are designed to relieve excess pressure by the controlled escape of container material.

Figure 6:
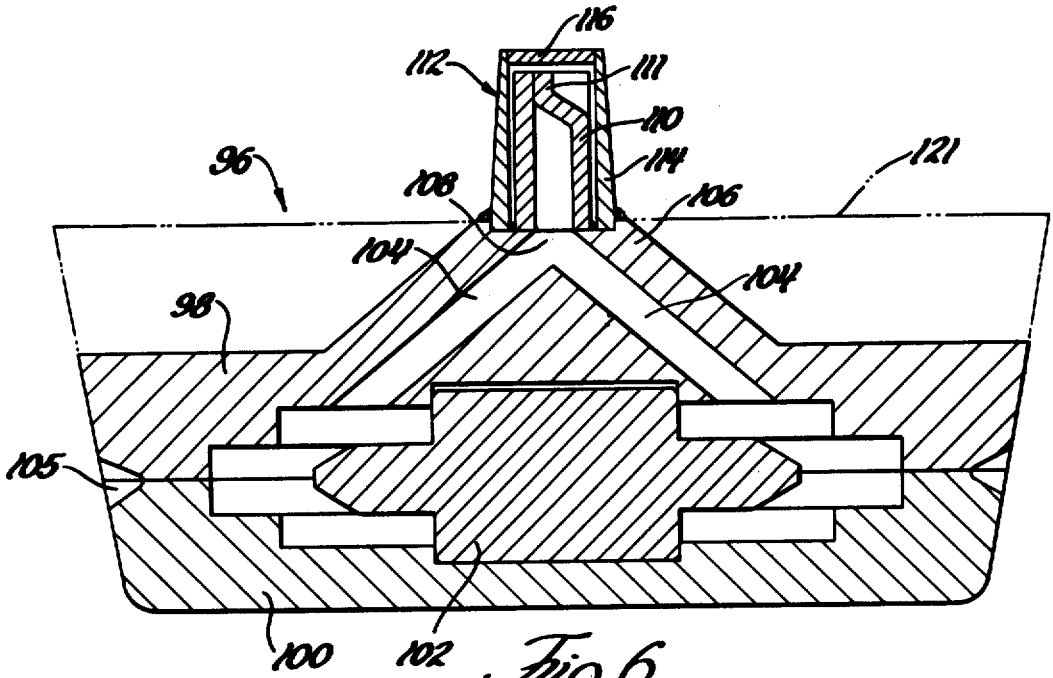
FIG. 6 is a cross-sectional elevational view of an embodiment of a container for hot consolidating powder designed particularly for hot consolidation in a press.

A container designed particularly for consolidating the powder using a press is shown generally at 96 in FIG. 6. The internal cavity of the container illustrates the rather complicated shapes which can be produced by this method. It should be apparent, therefore, that near net shapes can easily be produced. The container 96 includes an upper section 98 and a lower section 100 which have been machined from a low carbon steel. A core 102 is also machined from the same material and fitted between the upper and lower sections 98 and 100. As with the containers described above, the upper and lower sections 98 and 100 are welded together at their mating surfaces as indicated by the weldment 104.

In order to fill the cavity defined by the walls of the container 96 with powder, the upper section 98 is provided with one or more passageways 104 which communicate with the cavity. The passageways 104 extend through a conical-shaped portion 106 formed in the upper section 98 of the container and merge in a single opening 108. A fill tube 110 is welded to the upper section 98 of the container at the opening 108 for conducting powder into the passageways 104. The fill tube 110 is also used to connect a vacuum pump to the container 96 for evacuating the cavity prior to filling with powder.

After the container 96 has been evacuated and filled with powder, the fill tube 110 is closed by crimping the end of the fill tube as at 112.

When the powder is to be consolidated by pressing in a press, it is necessary to protect the fill tube 110 from damage. Since the contents of the container 96 are under a vacuum, damage to the fill tube 110 could result in a leak which would cause contamination of the powder. In order to prevent damage to the fill tube 110 a protective shield, generally indicated at 112, is welded to the container and surrounds the fill tube 110. The protective shield 112 comprises a sleeve 114 which is placed over the fill tube 110 and is welded to the container 96. In order to provide additional support the vacant space within the sleeve 114 may be filled with powder. A plug 116 is then welded across the entrance to the sleeve 114.

The upper die 82 includes a special configuration which corresponds to the exterior shape of the upper portion of the container 96. Specifically, it includes a tapered recess 118 which corresponds in size and shape to the conical portion 106 of the container 96. An extension 120 of the tapered recess is also formed to receive the protective shield 112 which is located on top of the container 96. It is noted that the extension 120 is also tapered and that the protective shield 112 is provided with a suitable draft angle for facilitating separation of the upper die 82 from container 96.

It is not essential that the container 96 include a domed portion 106. As an alternative the container 96 could have the shape indicated by the dotted line 121. The container shape shown, however, obviously requires less material than the alternative and, for this reason, is more desirable.

A typical procedure for compacting powder using a press includes the following steps. After the container 96 is fabricated a vacuum pump is connected to the fill tube 110 and the cavity of the container is pumped down to a level of about 10 microns. After evacuation the container is filled with powder while maintaining the cavity under vacuum. This can be accomplished by using a tee-type connection at the fill tube 110 wherein one branch of the tee is connected to the vacuum pump while the other branch is connected to a supply of powder. After filling, the fill tube 110 is closed. This may be accomplished by crimping the fill tube 110 and welding the crimped end.

As described above, the protective shield 112 is then attached to the container 96 so that it surrounds the fill tube 110.

The container 96 is then heated in a furnace to a temperature at which the powder will densify. The container material is selected so that at the appropriate densification temperature the container material will be capable of plastic flow when subjected to a pressure sufficient to cause densification of the powder. It has been found that for most applications, the container and powder are heated to a temperature of between 1,700° F. and 2,300° F. The specific temperature is selected in view of the alloy composition of the powder being compacted. Suitable densification temperatures are well known for common alloys. Within this range of temperatures a low carbon steel container will maintain structural integrity, but is capable of plastic flow at pressures exceeding about 5,000 psi. The heated container is then transferred to a press for consolidation of the powder.

A test part was made from titanium powder using a container having the configuration of container 96 by preheating to a temperature of about 1,750° F. and applying a pressure of about 15,000 psi by means of a standard mechanical press outfitted with tools similar to those shown in FIG. 6. After heating in the furnace for a time sufficient to obtain a uniform temperature throughout, the container was conveyed to a press fitted with dies having the configuration of the upper and lower dies 82 and 84. The press was then cycled through a single stroke. As described above, because the container is restrained by the lower die 82, the heated container material flows plastically and subjects the powder to a hydrostatic pressure which causes it to densify. Thereafter, the container 96 was ejected from the lower die 82 and cooled. The container was then removed from the densified powder compact.

Consolidating the powder using a press rather than an autoclave is advantageous since cycle time at maximum temperature can be reduced significantly. The typical cycle time in an autoclave can easily exceed four hours from loading to unloading while the cycle time for a press is measured in minutes. Moreover, autoclaves which operate in the 15,000 psi range are sophisticated pieces of equipment and are quite expensive. Therefore, the use of mechanical and hydraulic presses significantly simplify the consolidation process.

The invention has been described in an illustrative manner, and it is to be understood that the terminology which has been used is intended to be in the nature of words of description rather than of limitation.

Obviously, many modifications and variations of the present invention are possible in light of the above teachings. It is therefore, to be understood that the invention may be practiced otherwise than as specifically described herein and yet remain within the scope of the appended claims.

The embodiments of the invention in which an exclusive property or privilege is claimed are defined as follows:

1. A method for hot consolidating powder of metallic and non-metallic composition and combinations thereof to form a densified *and irregularly shaped* compact, said method comprising the steps of:

(a) providing a container by forming a cavity having the general *irregular* shape of the compact to be produced in a mass of container material which is substantially fully dense and incompressible and is capable of plastic flow at elevated temperatures, the volume of said mass being sufficiently large with respect to the volume of said cavity to form walls entirely surrounding said cavity of sufficient thickness so that the exterior surface of the walls *are regularly shaped and* do not closely follow the contour of said cavity, (b) filling said cavity with a powder to be compacted, (c) hermetically sealing said container, (d) *applying conventional compaction temperatures and pressures by* heating said container and powder to a temperature at which said mass is capable of plastic flow and the powder is susceptible to compaction and applying external pressure to the entire exterior surface of said container to apply a hydrostatic pressure to the powder in said cavity to densify said powder into a compact, and (e) cooling said container and compact and removing said container from said compact.

2. A method for hot consolidating powder of metallic and non-metallic composition and combinations thereof to form a densified powder compact comprising the steps of (a) encapsulating a quantity of powder *in an irregularly shaped cavity* in a thick-walled metal container wherein the walls of the container *are regularly shaped and* entirely surround the powder and are substantially fully dense and incompressible and are capable of plastic flow at predetermined temperatures and pressures, (b) heating the container and powder to a *conventional compaction* temperature at which the powder will densify and (c) applying *a conventional compaction* pressure to the entire exterior surface of the heated container by pressing the container between the dies of a press while restraining the container the applied pressure being of sufficient magnitude to cause plastic flow at the container walls thereby subjecting the powder to a hydrostatic pressure which causes it to densify.

3. The method set forth in claim 2 including the step of permitting controlled escape of container metal from between the press dies when the pressure exceeds a desired maximum to prevent damage to the press.

4. A method for hot consolidating powder to form [a] *an irregularly shaped and* densified powder compact comprising the steps of (a) encapsulating a quantity of powder in a thick-walled low carbon steel container wherein the walls of the container *are regularly shaped and* entirely surround the powder and are substantially fully dense and incompressible and are capable of plastic flow at temperatures above 1,000° F. and a pressure exceeding 5,000 psi, (b) preheating the container and powder to a temperature above 1,000° F. and (c) applying a pressure above 5,000 psi to the entire exterior surface of the container by pressing the container between the dies of a press while restraining the container thereby causing plastic flow of the container walls to subject the powder to a hydrostatic pressure which causes it to densify.

5. The method set forth in claim 4 including the step of permitting controlled escape of container metal from between the press dies when the pressure exceeds a desired maximum to prevent damage to the press.

6. The method as set forth in claim 1 wherein the step of applying external pressure to the entire exterior surface of said container is further defined as applying gas pressure in a gas autoclave.

7. The method as set forth in claim 1 wherein the step of applying external pressure to the entire external surface of said container is further defined as pressing the container between the dies of a press while restraining the container to cause plastic flow of the container walls.

*8. A method for hot consolidating material of metallic and nonmetallic composition and combination thereof to form a fully densified compact comprising the steps of: encapsulating a quantity of less than fully dense material in a cavity of irregular shape in a thick-walled container having a regular shape and walls entirely surrounding the cavity and of sufficient thickness so as not to follow the contour of the cavity and of a material which is substantially fully dense and incompressible and capable of plastic flow at elevated temperatures, heating the container and material to a conventional compaction temperature at which the container is capable of plastic flow and the material is susceptible to compaction and will densify and applying conventional pressure to the entire exterior surface of the container thereby causing plastic flow of the container walls to transmit pressure to the material to cause full densification at hydrostatic pressre applied by the container.*

*9. A method as set forth in claim 8 further defined as encapsulating the material in the cavity by hermetically sealing the container.*

*10. A method as set forth in claim 8 further defined as forming the container of a gross volume of wall material which is greater than the volume of the cavity surrounded by the container wall material.*

*11. A method as set forth in claim 8 further defined as forming the container of a gross volume of wall material which is greater than the volume of the cavity surrounded by the wall material and decreasing the volume of the cavity during densification of the compact as the volume of the wall material remains constant.*

*12. A method as set forth in claim 8 further defined as removing the container from the compact.*

*13. A method as set forth in claim 8 including cooling the container and compact and removing the container from the compact.*

*14. A method as set forth in claim 8 further defined as forming the container by mating at least two metal container sections together by welding.*

*15. A method as set forth in claim 8 wherein the step of applying external pressure to the entire exterior surface of the container is further defined as applying gas pressure in an autoclave.*

*16. A method as set forth in claim 8 wherein the step of applying external pressure to the entire exterior surface of the container is further defined as applying force to a portion of the container while restraining the remainder of the container to cause the hydrostatic pressure and plastic flow of the container for densification.*

* * * * *